US009933523B2

(12) United States Patent
Fitzgerald et al.

(10) Patent No.: US 9,933,523 B2
(45) Date of Patent: Apr. 3, 2018

(54) SYSTEMS AND METHODS TO ENHANCE RELIABILITY OF MEASURED POSITION DATA

(71) Applicant: YOUGETITBACK LIMITED, Cork (IE)

(72) Inventors: William Fitzgerald, Cork (IE); Patrick Conway, Cork (IE); Peter Bermingham, Cork (IE)

(73) Assignee: YOUGETITBACK LIMITED, Cork (IE)

( * ) Notice: Subject to any disclaimer, the term of this patent is extended or adjusted under 35 U.S.C. 154(b) by 904 days.

(21) Appl. No.: 13/969,497

(22) Filed: Aug. 16, 2013

(65) Prior Publication Data
US 2014/0159952 A1    Jun. 12, 2014

Related U.S. Application Data

(60) Provisional application No. 61/684,077, filed on Aug. 16, 2012, provisional application No. 61/788,029, filed on Mar. 15, 2013.

(51) Int. Cl.
G01S 19/01    (2010.01)
G01S 19/42    (2010.01)

(52) U.S. Cl.
CPC ............ *G01S 19/01* (2013.01); *G01S 19/426* (2013.01)

(58) Field of Classification Search
CPC .............................. G01S 19/01; G01S 19/426
(Continued)

(56) References Cited

U.S. PATENT DOCUMENTS 7,296,046 B2 * 11/2007 Ono .................... G01S 19/40
708/445
2009/0253406 A1    10/2009 Fitzgerald et al.
(Continued)

FOREIGN PATENT DOCUMENTS

EP    1443341 A1    8/2004
EP    1752785 A2    2/2007
(Continued)

OTHER PUBLICATIONS

Binkyuk, "Challenge-response authentication—Wikipedia, the free encyclopedia," Aug. 10, 2012, retrieved from internet.
(Continued)

*Primary Examiner* — Tashiana R Adams
*Assistant Examiner* — Helena H Seraydaryan
(74) *Attorney, Agent, or Firm* — Dickinson Wright PLLC

(57) ABSTRACT

There is disclosed systems and methods to enhance reliability of measured position data. Measuring devices, such mobile phones equipped with location measurement elements (such as GPS, LBS, network location reporting, or tower location triangulation reporting) may collect various samples of positions where the device is believed to be located at particular moments in time; however such measurements often vary even if the device is not moving because of device inaccuracy, atmospheric conditions, obstructing buildings, and the like, making it difficult to determine whether such devices are actually stationary or are in motion over predetermined time periods. Systems and methods of the present invention provide for enhanced accuracy of position data by selectively merging varying location positions that are attributable to noise or accuracy deviations, and providing an enhanced assessment of actual device position.

38 Claims, 4 Drawing Sheets

(58) Field of Classification Search
USPC .................................................. 342/357.39
See application file for complete search history.

(56) References Cited

U.S. PATENT DOCUMENTS

2010/0100307 A1* 4/2010 Kim ...................... G01S 5/0027
                                                          701/119
2010/0134348 A1* 6/2010 Mizuochi ................ G01S 19/42
                                                          342/357.23

FOREIGN PATENT DOCUMENTS

EP          1862811 A2   12/2007
WO       200233435 A2    4/2002

OTHER PUBLICATIONS

Anonymous, "Short Message Service—Wikipedia, the free encyclopedia," Aug. 3, 2012, retrieved from the internet.
International Search Report and Written Opinion of the International Searching Authority for related application PCT/IB2013/001950 dated Feb. 3, 2014.
International Search Report and Written Opinion of the International Searching Authority for related application PCT/IB2013/002260 dated Feb. 3, 2014.

* cited by examiner

SYSTEMS AND METHODS TO ENHANCE RELIABILITY OF MEASURED POSITION DATA

CROSS REFERENCE TO RELATED APPLICATIONS

This application is a continuation-in-part of U.S. Provisional Patent Application No. 61/684,077 filed Aug. 16, 2012 titled, "SYSTEMS AND METHODS TO ENHANCE RELIABILITY OF GPS POSITION DATA," and claims priority to U.S. Provisional Patent Application Ser. No. 61/788,029 file Mar. 15, 2013, titled, "SYSTEMS AND METHODS TO ENHANCE RELIABILITY OF GPS POSITION DATA," the disclosures of which are fully incorporated herein by reference for all purposes.

DESCRIPTION OF THE INVENTION

Field of the Invention

The present invention relates to systems and methods for improving accuracy of position measurements; and more particularly, for improving location measurements for devices operating with positioning systems such as the Global Positioning System (GPS).

Background of the Invention

For as long as mankind has needed to travel, methods to measure a person's location on the surface of Earth were needed. Well-known techniques such as celestial navigation have been used for centuries to attempt to calculate and determine the position of a point on earth, such as the current position of a ship at sea. In the twentieth century, electronic navigation systems such as the British GEE systems and the LORAN system were developed and used extensively in various embodiments around the world, providing a means to determine location regardless of whether time of day or weather permitted celestial position fixes. However, systems such as LORAN require the installation of numerous transmitter stations wherever navigation is required, and systems like LORAN suffer from electronic effects of weather and the ionospheric effects of sunrise and sunset. Further, the interference of the LORAN groundwave with the indirect skywave creates multipath interference, reducing accuracy of the system at certain times of day. Further, magnetic storms of extraterrestrial origin are also well known to interfere with radio-based navigation and position fixing systems.

Beginning in 1960, satellite navigation systems were created by the U.S. military to provide nearly global coverage for military location fixing applications, but were subject to significant accuracy limitations and could provide location fixing solutions after long time delays. Research continued, and in 1973, the Global Positioning System, or "GPS," was created to provide improved accuracy and timing in location determination for military aircraft, missiles, ships, or troops. The GPS system became fully operational as of 1994, and continued improvements of the GPS satellite constellation have allowed for greater accuracy and operational performance, and provided for commercial use of the formerly exclusively military resource. During the 1990s, GPS employed a feature called Selective Availability that degraded civilian accuracy on a global basis, but in May 2000, at the direction of President Bill Clinton, the U.S. government ended its use of Selective Availability in order to make GPS more responsive to civil and commercial users worldwide. Other competing satellite geolocation systems are in development, including the Russian Global Navigation Satellite System (GLONASS), the European Union Galileo positioning system, the Chinese Compass navigation system, and the Indian Regional Navigational Satellite System.

Even though a dramatic improvement over prior approaches, GPS is not without error. According to system design parameters, the GPS signal in space will provide a "worst case" pseudorange accuracy of 7.8 meters, but can vary by a number of factors including atmospheric effects and receiver quality. Further, local conditions, weather, extraterrestrial solar events and other issues may cause inaccurate reporting of GPS geolocation fixes. Methods and systems are needed to address the varying accuracy of data measured by GPS devices, and to determine when such data indicate the device is moving versus noisy or inaccurate readings of a relatively static location.

Location coordinates received from mobile devices are subject to GPS scatter. This (GPS scatter) problem causes a number of issues, including (a) mobile device may report different coordinates each time a location is determined, even if the mobile device does not move; (b) the accuracy of the mobile device reported location may vary depending on a number of conditions well known to those skilled in the art; (c) it is problematic to accurately determine the location of a mobile device when given a set of different location coordinates for the mobile device; (d) mobile devices can appear to be moving even though they may not be moving; (e) mobile devices can provide allegedly accurate locations that are actually distant, for example miles, from the true location. The allegation of accuracy may be a faulty indication provided by the GPS chip, and may be due not only to atmospheric scatter but also to other factors, such as the position of the GPS satellites with respect to the horizon, multipath, number of satellites blocked, and other factors.

Some of the factors contributing to GPS Scatter may include: (a) Atmospheric effect—Any change in atmospheric condition can affect GPS radio signals as signals travel through the thick layer of the atmosphere. Both ionosphere and troposphere can leave little or more impact on the speed of the radio signals. Dual frequency measurement or comparing the two frequencies L1 and L2 can reduce the error and also define a precise location of the receiver. (b) Multipath effects—This occurs when signals are get reflected or bounced by coming in contact with surrounding hills, buildings or any kind of hard core object before it reaches the receiver. Thus, increase in travel time of signals cause error. However, with the help of the technique named narrow collector spacing the receiver recognizes the long delay signals and does not take into account while calculating the precise time and location. Also there are some specialized antennas are used to measure the exact data from the signals that are slightly deviated or delayed. But it's a bit difficult as the fluctuation is very little in atmospheric delay. (c) Receiver clock error—The receiver enabled with a clock that is not as accurate as the atomic clock in satellite and so produce a little timing error. (d) Orbital error—This occurs when the satellite's orbital location is calculated wrongly. As the right location of the satellites position in the orbit is essential, even a small error can leave a large difference as far as accuracy is concerned. (e) Satellite geometry—It is the exact position of the satellite at a given period of time. Ideally when satellites are located in wide angles from each other, it becomes easy to measure distance. However, poor satellite geometry occurs when they are in a line or in a tight grouping.

Over time, it has been recognized that there is a need for improved accuracy in the GPS system. There are many augmentation systems to improve accuracy such as Nationwide Differential GPS System (NDGPS), Wide Area Augmentation System (WAAS), Continuously Operating Reference Stations (CORS), Global Differential GPS (GDGPS), and International GNSS Service (IGS); however, all of these systems depend on availability of a supplemental signal, base station, or satellite, and all require additional augmentation of receiver hardware to refine the position fixing algorithm.

Cellular devices, especially modern smartphones, have the capability of measuring their position through internal circuitry such as GPS location components, or by receiving network reported location that is determined through external means such as cellular tower triangulation. Other measurement devices also use traditional RF approaches such as Time Difference Of Arrival (TDOA) measurements, but each come with an inherent level of error that can make a collection of readings of a location appear as if the measurement device were moving around while it is in fact fixed at one location during the measurement interval.

What is needed is an improved approach for determining location of a device that is measuring a location and reporting positions to a data storage device. What is also needed is a system that improves position or geolocation accuracy without needing to rely on satellite location augmentation systems.

SUMMARY OF THE INVENTION

Both the foregoing summary and the following detailed description are exemplary and explanatory only and are not restrictive of the invention as claimed.

There is provided a method for enhancing reliability of measured position data, comprising the following steps: a. obtaining a plurality of position measurements, the measurements comprising a position value, a time of measurement value, and an accuracy value; b. organizing the plurality of position measurements into an ordered list comprising sorting the plurality of position measurements using a sorting key comprising at least one of the position values, the time of measurement values, and the accuracy values; c. obtaining a first position measurement from the ordered list; d. obtaining successive position measurement from the ordered list wherein said successive position measurement corresponds to a lower ranking in the ordered list than the first position measurement; e. determining whether a successive position measurement in the ordered list should be merged in a merge operation with said first position measurement, wherein: should the determination indicate that the first position measurement and the successive position measurement be merged, performing a merge operation comprising creating a merged position measurement using a merge algorithm with the first position measurement and the successive position measurement as inputs, and replacing the first position measurement and the successive position measurement in the ordered list with a single merged position measurement, assigning the merged position measurement to be the first position measurement and iterating to step d. until no more successive position measurements remain in the ordered list whereupon processing continues with step f; and should the determination indicate that the first position measurement and the successive position measurement not be merged, assigning the successive position measurement as the first position measurement, and iterating to step d. until no more successive position measurements remain in the ordered list whereupon processing continues with step f.; and f. for each non-merged position measurement remaining in the ordered list, identify whether said remaining position measurement corresponds to an outlier measurement by: determining whether said each position measurement was immediately preceded by a merged position measurement in the ordered list or immediately followed by a merged position measurement in the ordered list, and should such determination be made, removing said outlier value from the ordered list. Additionally, the method may comprise the steps that if after step f. was completed the ordered list was modified as a result of steps e. and f., and if at least two position values remain in the ordered list: assigning a first value in the ordered list as the first position measurement; and continuing processing with step d.

The determination that position measurements should be merged may be made by any conventional method. In one embodiment, determining whether a successive position measurement in the ordered list should be merged in a merge operation with said first position measurement further comprises: e1. determining a distance between the position value of the first position measurement and the position value of the successive position measurement; and e2. if the determined distance is less than an accuracy threshold, indicating that the first position measurement and the second position measurement be merged. Further, determining a distance between positions may be done by any conventional means, and in one embodiment, determining a distance between the position value of the first position measurement and the position value of the successive position measurement further comprises using the well-known Haversine formula to calculate the distance between points indicated by the position value of the first position measurement and the position value of the successive position value.

With each position measurement, an accuracy value may be associated and comprises any relevant accuracy value including accuracy of a device, noise values known to the system, accuracy impeded by insufficient satellite dwell time, accuracy estimated for a particular position measuring circuit, and other values. Accuracy thresholds, in one embodiment, are determined by the sum of: the accuracy value of the first position measurement multiplied by an accuracy adjustment constant; and the accuracy value of the successive position measurement multiplied by the accuracy adjustment constant. The accuracy adjustment constant may be computed by a predetermined constant divided by a minimum accepted accuracy value, such as where the predetermined constant is 250.

One embodiment of the present invention computes a merged location by determining a merge point that lies between the positions of the first position measurement and the successive position measurement. If a line is defined that includes holds the first position measurement point (call it point "A" located at position $(xA, yA)$) and the successive position measurement point (call it point "B" located at position $(xB, yB)$,) then a merge point M can be defined to be on the line between A and B, and in one embodiment, is located at a point that is distance-proportional to the respective accuracy values of points A and B. Considering that the accuracy values may represent an area of uncertainty defined by an approximate circular shape, the lower the value (corresponding to the radius), the higher the reported position accuracy. Therefore, if the distance between A and M, associated with the reported accuracy of the A measurement is represented by k1, and if the distance between M and B, associated with the reported accuracy of the B measurement is represented by k2, the position of point M $(xM\ yM)$ may be computed as $xM=(k1*xB+k2*xA)/(k1+k2)$ and $yM=(k1*yB+k2*yA)/(k1+k2)$. Therefore, in one implementation, the single merged position measurement is derived by: determining the formula for a theoretical line that contains the position value for the first position measurement and the position value for the successive position measurement; calculating a position of a merge point that lies on the line by dividing the line in a ratio of the accuracy value of the first position measurement and the accuracy value of the successive position measurement; and assigning the position of the merge point to the position value of the merged position measurement. The position of the merge point may be then assigned to the computed (xM, yM). Likewise, those of skill, in the art appreciate that three dimensional approaches may also be represented with an additional z dimension calculation. The merged position measurement may also have time of measurement and accuracy values populated by any appropriate approach. In one embodiment wherein the single merged position measurement is further derived by: assigning an average of the accuracy values of the first position measurement and the successive position measurement to the accuracy value of the merged position measurement; and assigning an average of the time of measurement values of the first position measurement and successive position measurement to the time of measurement value of the merged position measurement.

The position values may comprise any type of data that is necessary for the present invention. In various embodiments, the position value comprises a latitude value and longitude value, and optionally an altitude value. Further, the position values may comprise Cartesian coordinates representing a location on a map, Cartesian coordinates representing a location on Earth, or in fact, Cartesian coordinates representing any location such as a location in space or a location on a globe. The position value may comprise any type of coordinate system including systems such as universal transverse mercator (UTM) coordinates.

Any number of position measurements may be taken before performing the methods of the present invention to enhance accuracy. In one embodiment, obtaining a plurality of position measurements further comprises determining a predetermined number of position measurements based on a perceived accuracy of a measuring device, and specifying that the predetermined number of position measurements be obtained prior to proceeding with step b. above. Further, obtaining a plurality of position measurements may further comprise determining a predetermined number of position measurements based on a perceived accuracy of a measuring device, and specifying that the predetermined number of position measurements be obtained prior to proceeding with step b. above.

The results of steps of the method of the present invention may allow increased accuracy of inferring whether a device is in motion or at rest. One embodiment comprises determining that a measurement device is not in motion by determining that a subset of the plurality of position measurements were merged in the ordered list. Further, an aspect of the present invention comprises determining that a measurement device is in motion by determining that after completion of steps a. through f. above, more than one of the position measurements remain unmerged in the ordered list.

There are also provided systems of the present invention, where a measuring device, such as a GPS component within a mobile phone is used to determine position, and the measurements (including position, accuracy, and measurement times) are stored in a memory of a device, or sent through a network in communication with the device to a remote storage location such as a server with a database. Any location measurement technique may be utilized with devices of the present invention, including terrestrial location-based service data (LBS), radio ranging systems such as LORAN, and satellite location systems such as GLONASS, Galileo or the like. Regardless of the storage location, systems of the present invention may operate upon the plurality of position measurements to determine enhanced reliability and accuracy of a device. The network may comprise any type of cellular system such as GSM, CDMA, TDMA, FDTMA, AMPS or others, and may also comprise a wired or wireless link to a remote storage device such as a database.

In one embodiment, the system includes a measuring device, which may comprise a position measurement component within one of a mobile telephone, a smartphone, a computing tablet, a mapping device, a survey instrument, a GPS navigation device, a traffic navigation device, an airspace navigation device, a water navigation device, a seismograph, a laser measurement device, and combinations of thereof. A storage device may be coupled to the measuring device either directly, such as in the case of local volatile or nonvolatile memory in the device, or remotely via a network connection to a server with a database, the storage device configured to store a plurality of position measurements; a processor, coupled to the storage device; a memory, coupled to the storage device, that contains instructions configuring the system to execute steps comprising the methods of the invention described above. The steps of the method may be executed solely on a processor within the device, on a processor in a remote server that is coupled to the device, or in a combination of both locations.

BRIEF DESCRIPTION OF THE DRAWINGS

A more complete understanding of the present invention may be derived by referring to the detailed description and claims when considered in connection with the following illustrative figures.

DETAILED DESCRIPTION OF EXEMPLARY EMBODIMENTS

Figure 1:
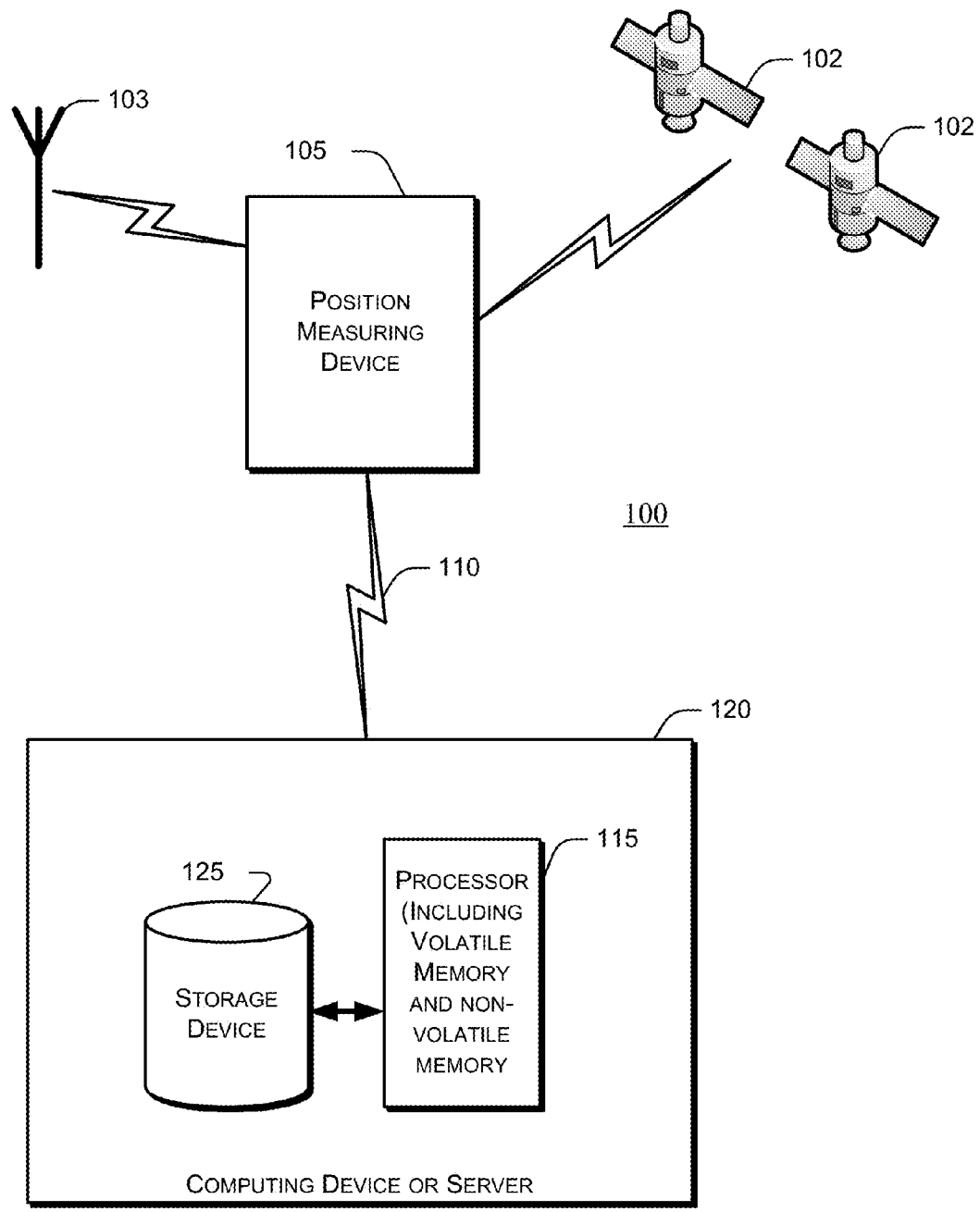
FIG. 1 is a diagram depicting an exemplary system of the present invention.

GPS scatter may be viewed as encompassing two or more different problems, a first problem involving inaccurate GPS position determinations made for a mobile device in real time and a second problem involving inaccurate GPS position determinations made for a mobile device retroactively. Solutions for the first problem are generally concerned with providing real-time solutions that address inaccuracies associated with satellite signals received by the GPS receiver on the mobile device. In contrast, solutions for the second problem take GPS output over a period of time and adjust for and correct any inaccuracies in the GPS output from a mobile device.

The solutions for both of the above-identified first and second problems try to solve their respective problems at the GPS receiver. Solutions for the first problem deal mainly with multipath problems where the signal(s) from the satellite(s) do not arrive directly at the receiver but are "bounced" off of one or more objects, e.g., a building. Such reflections can be a primary contributor to inaccurate position output from a GPS receiver. Again, solutions directed to the first problem are solving their problem at the source in real-time; they are trying in real time to calculate the accurate current location based on the received satellite signals. Moreover, solutions directed the first problem are typically geared towards navigation systems, where one is trying to navigate a known route.

In contrast, solutions directed to the second problem are intended to solve a different issue. Specifically, solutions directed to the second problem are typically taking the output from a GPS receiver, over time, which is known to be subject to inaccuracy and scatter (e.g., where without moving the GPS receiver will often give differing locations for the receiver and related mobile device). Solutions directed to the second problem do not typically have or use information about the location and or route of the mobile device. Solutions directed to the second problem may retrospectively look at the data gathered and determine where there is scatter and where there are false locations (i.e., a high level of inaccuracy). Such analysis may allow one to accurately determine where the mobile device has not moved (despite position reports to the contrary) and where the mobile device was moving, but such analysis comprises a retrospective calculation on where the mobile device was, rather than a real-time calculation of where the device is (which is the concern of the first problem identified above). Nevertheless, solutions directed to the second problem above may have application in GPS receivers to calculate accurate current positions based on retrospectively looking at prior position reports for the mobile device.

Furthermore, the term "scatter" can refer to the case where a circle defined by the center point of a mobile device's reported coordinates and the radius of reported accuracy contains within it the actual location of the mobile device and further that when the mobile device has remained stationary, it has reported differing locations for the mobile device, one or more of which are close to the actual location of the mobile device, thus making it appear to indicate that the mobile device has moved. The phrase "false locations" refers to circles defined by the center point of mobile device's reported coordinates and the radius of reported accuracy not containing within it the actual location of the mobile device. A fudge factor may be determined based on the minimum accuracy which the device is reporting. Currently, embodiments of the present invention may only report a location to where the accuracy is <=100 meters (this is a non-static figure . . . i.e., it can be changed in testing) and one may use a fudge factor off 2.5. High level of inaccuracy may be considered to be the case where the (accuracy*fudge factor) is greater than the distance from a reported location to an actual location. So currently, a high level of inaccuracy may be where the reported location is greater than 250 meters from the actual location.

Figure 2:
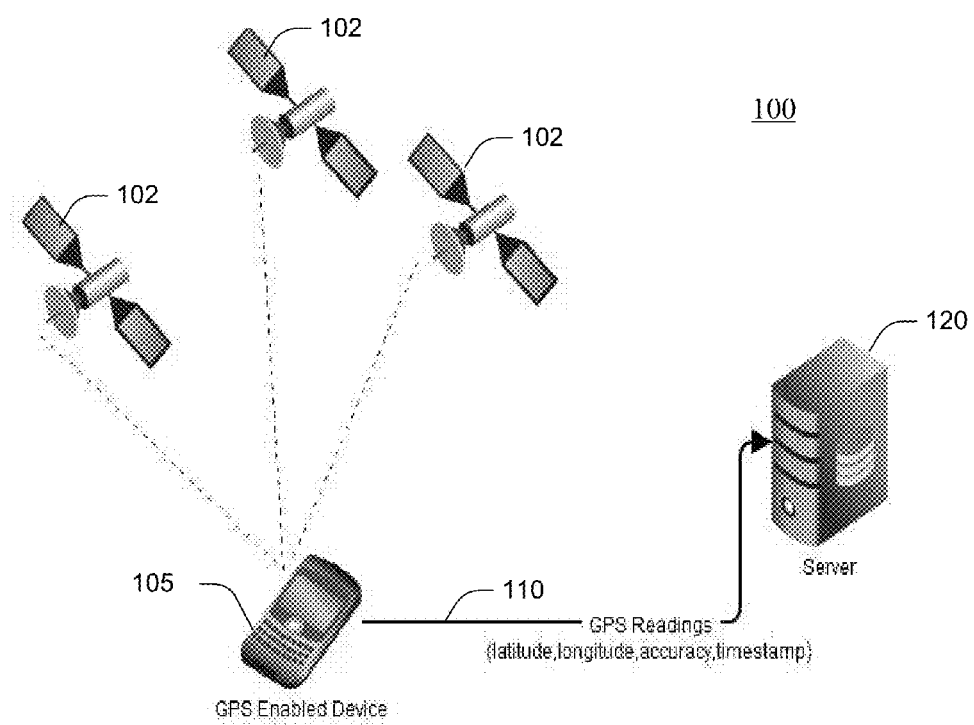
FIG. 2 is a diagram depicting an alternate system of the present invention.

FIG. 1 illustrates an exemplary system 100 of the present invention. Position measuring device 105 receives signals from a satellite network 102, a terrestrial network 103, or both, and such signals provide information for the measuring device 105 to obtain a plurality of position measurements. Measuring device 105 may be a position measurement subsystem within a larger device such as GPS circuitry within a cellular telephone, smartphone, tablet, or the like, or may be a dedicated location sensing and measurement device. Position measuring device 105 is coupled 110 to a computing device 120, which may comprise a remote server or may be additional hardware directly interfaced to the position measuring device 105, and the position measuring device 105 relays position measurements to the computing device 120 for storage in the storage device 125 and processing by the processor 115. Computer programs stored in the device 125 or the memory associated with the processor 115 provide instructions that when executed, carry out embodiments of the present invention in the system 100. Computing device 120 further comprises a processor 115 with memory (volatile and non-volatile) coupled to the storage device 125. A similar arrangement is illustrated in FIG. 2, where a smartphone contains a position measuring device 105, whose plurality of position measurements are reported 110 to a remote server 120 that contains a storage device 125, processor 115 and memory (not shown).

Figure 3:
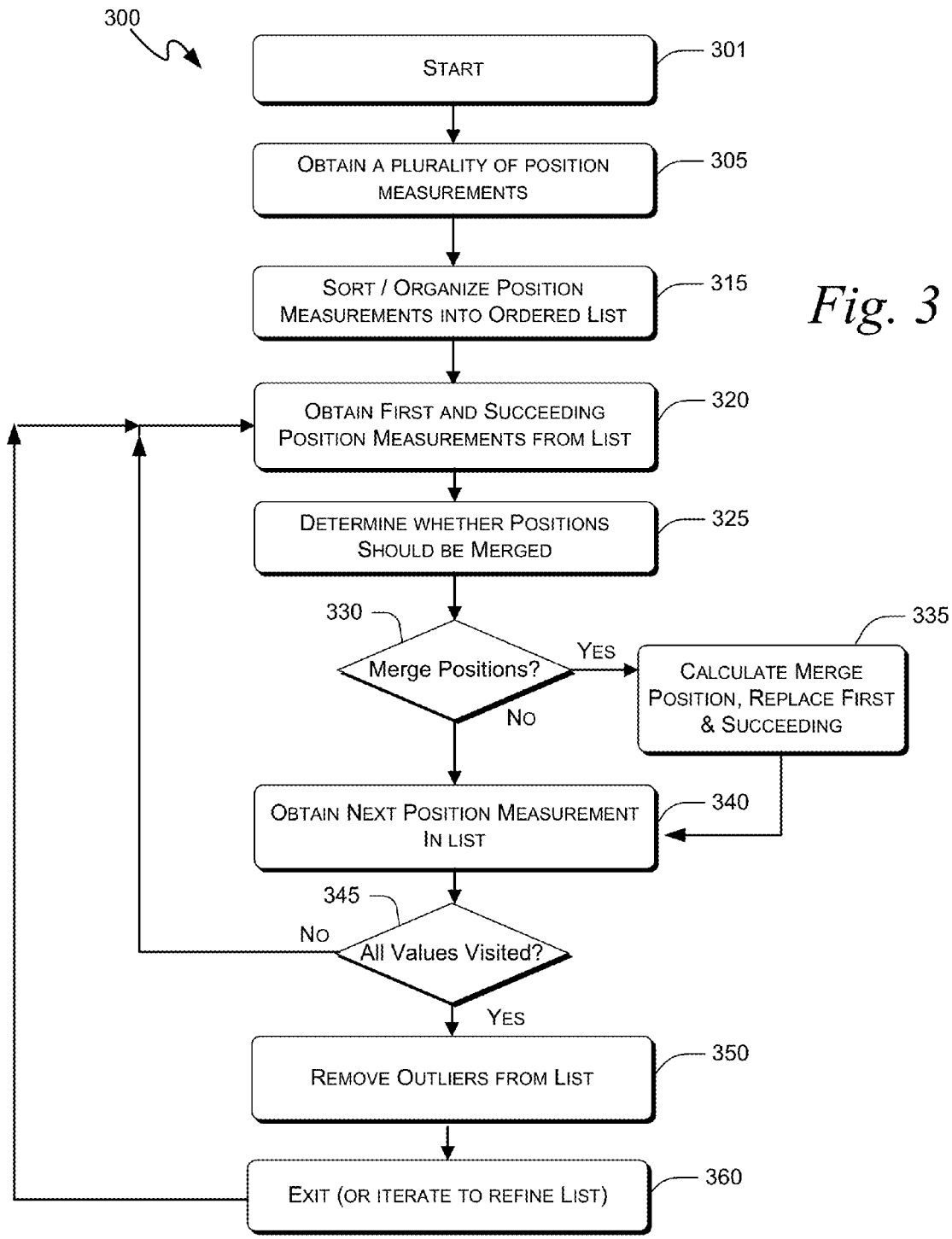
FIG. 3 is a flow diagram depicting an exemplary process of the present invention.

FIG. 3 depicts a flow diagram 300 illustrating the method of the present invention. In Step 305, a plurality of position measurements is obtained by a measurement device, and each position measurement is associated with a position value, an accuracy value and a time of measurement value. These measurements are sorted (such as by the time of measurement) and organized into an ordered list 315, and processing begins with the first measurement value in the list with the next lower ranked value 320. A determination is made 325 whether the first and succeeding position measurements should be merged based on, for example, whether regions of uncertainty overlap (corresponding to accuracy measurements), see also the illustration in FIG. 4. If, 330, there is an intersection of uncertainty regions, then the two position measurements are merged into a single merge position 335, with the new merged position being set between the first position measurement and the succeeding position measurement by a distance governed by the ratio of the uncertainty region extent associated with each measurement position (put another way, calculating a position of the merge point that lies on the line segment between the two points by dividing the line segment in a ratio of the accuracy value of the first position measurement and the accuracy value of the successive position measurement). Then, the next position values are obtained 340, and if more position measurements remain in 345 in the ordered list, iteration continues to step 320 until either no more merges can occur or the entire list has been merged. Then in step 350, outliers are determined by finding position measurements that have merged positions either preceding or following them in the ordered list, and such outliers are deleted from the ordered list. In step 360, the entire process may iterate, such as may be the case when in the last pass through the process, at least one position value was merged or removed. Once no further measurements may be merged or eliminated, the process terminates 360.

Embodiments of the present invention may include or utilize one or more of the following techniques:
  A. Each position location for the mobile device may be received with a latitude value, a longitude value and an accuracy value.
  B. The latitude value and longitude value may be assumed to be the center point of a circle (around the mobile device) and the accuracy value may be assumed to be the radius of the circle.
  C. The above values (latitude, longitude and accuracy) may be used to determine:
    1. When a mobile device has not moved.
    2. A more accurate location when a mobile device has not moved.
    3. Erroneous locations received from a mobile device, which may be referred to as "outliers."

Embodiments of the present invention may include or utilize one or more of the following steps:
- A. One may obtain one or more lists of locations from a mobile device for a given period of time.
- B. One may sort this group of one or more lists according to any desired parameter, such as the time that each location was received (e.g., sorting in forward chronological order, reverse chronological order or any other desired sequence).
- C. One may iterate through the group of one or more lists and merge consecutive locations using, for example, Formula 2 as set forth below, where there is intersection between their circles—Formula1.
- D. One may then check the group of one or more lists for outliers, which may be defined as any reported mobile device location that is preceded or followed by a merged bunch. Detected outliers may then be withdrawn from the list as erroneous locations.
- E. One may then recursively call our algorithm (steps A-D above) until there are no more intersections found. In steps A-D above, if the list has changed (i.e., one or more outliers removed, or locations merged), one may perform steps A-D on the modified list, and if the list has not changed the problem may be solved, and one may return the list as the result, i.e., the problem is not solved until the same process has been applied on the modified list.

Embodiments of the present invention that implement the above process may provide a clean list of locations where the mobile device was stationary or where the mobile device has moved, with the stationary locations adjusted for GPS scatter.

Various embodiments of the present invention can control an accuracy sampling time on the client. For example, instead of taking the first location that had accuracy of less than n, certain embodiments keep searching for a period of time after an allegedly accurate location has been found. For example, certain embodiments sampling for m locations. This may account for situations in which a chip, for example a GPS chip, was reporting an incorrect accuracy initially in the sampling. This delayed acceptance of accuracy can avoid accepting as accurate locations that are of reported accuracy n, but which are actually miles away from actual location.

Thus, for example, each position location for the mobile device may be received with a latitude value, a longitude value and an accuracy value. Even when the accuracy value indicates that the location is reliable, the system may wait until a plurality of such locations are reported, where m is the number of such allegedly accurate location reports that are received, before the mobile device concludes that the accuracy value is legitimate.

Various embodiments of the present invention may rely on collaboration of the different satellite systems providers. For example, GPS, GLONAS, Galileo, BeiDou Navigation Satellite System (BDS), COMPASS, Indian Regional Navigational Satellite System (IRNSS), and the like can collaborate together to provide even more accurate location information. Alternatively, the signals of the different satellite systems providers may be combined in the mobile device or a chip or set of chips within the mobile device.

Moreover, positioning data may be compared to predetermined validation criteria to determine whether to accept a reported location. For example, when a reported location is not on a road, the number of location reports required for the mobile device to accept the reported location may be higher than a default number of location reports. Alternatively, when the reported location is a home location of the mobile device, the report may be accepted with a smaller number of location reports, or even with one location report. Similarly, if certain reported areas are known to be falsely reported areas associated with multipath, the mobile device can require a higher number of reported locations before accepting the position as legitimate.

A formula hereby labelled Formula 1 is provide to outline when locations should be merged. Inputs to this formula include lat1, lng1, acc1, (latitude, longitude, and accuracy value for the first measurement position) and lat2, lng2, acc2 (latitude, longitude, and accuracy value for the second measurement position). The well-known Haversine formula is used to calculate distance (d) in meters from (lat1,lng1) to (lat2,lng2). Then a minimum accepted accuracy (m) is a predefined minimum accepted accuracy the device will send adjustment (a)=250/m. Then the determination is made, if d<(acc1*a+acc2*a), the points should be merged into a new merger point. By way of further detail, if the minimum accepted accuracy is 25 meters, the adjustment (a) will be 4. So if the distance in meters from (lat1,lng1) to (lat2,lat2) is less than ((acc1*4)+(acc2*4)), it is taken that the device has not moved and these two locations will be added to a set to be merged. The values lat2, lng2, acc2 will be checked against the next location (lat3, lng3, acc3) and it will be added to the set to merge if the condition above is satisfied. This continues until the condition evaluates to false, at which point the set of locations is merged, and to calculate the merge value, Formula 2 is utilized.

Formula 2 is utilized for merging locations. Similar to the previous step, the input includes [(lat1, lng1, acc1, w1), (lat2, lng2, acc2, w2) . . . (latn, lngn, accn, wn)], where w includes a weighting factor for each position measurement. For each pair of locations in the set the line (l), between the center points of the locations is divided in the ratio of the accuracy of the locations (r). Where the locations being merged are themselves merged bunches the accuracy is multiplied by a weighting (w), (the number of locations in the merged bunch). Therefore, the ratio (r) is (acc1*w1):(acc2*w2). This allows the process to favor location groupings (or bunches) with more locations when merging. This provides a list of accuracy-adjusted coordinates which are averaged to obtain a more accurate representation of the device location.

Figure 4:
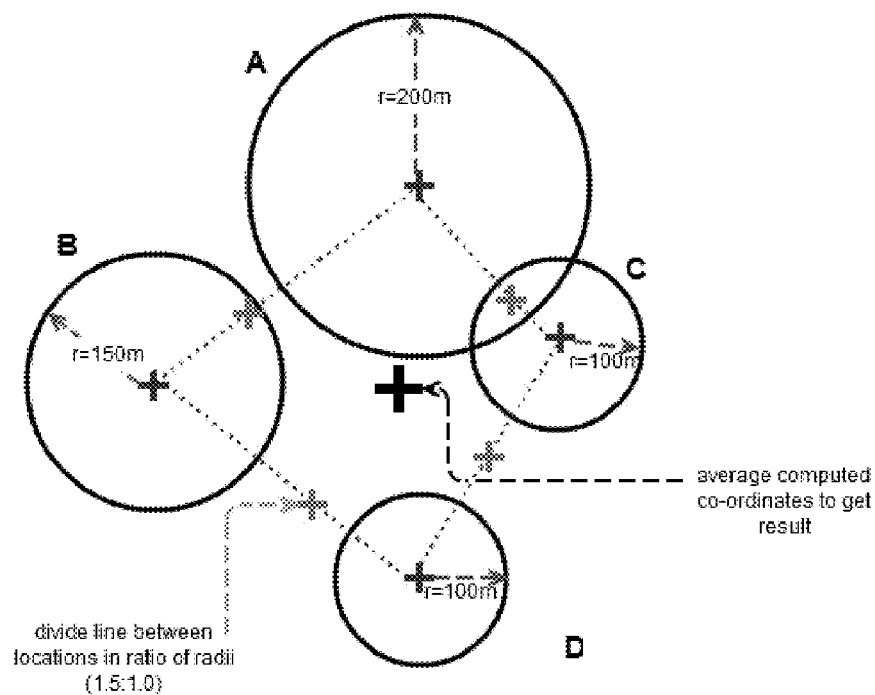
FIG. 4 is a diagram depicting overlap of uncertainty regions in determining whether to merge location measurements.

Alternatively, and in addition to the process shown in FIGS. 3-4, A Method for producing enhanced position measurements comprises:
1. Retrieve the location information from local database
2. Sort the list in order according to desired sorting parameter or parameters, e.g., time.
3. Traverse this list determining if each location "intersects" with the location which follows it. Intersection is determined by the following: d<(acc1*adj+acc2*adj), where d is the distance between the 2 locations, calculated using the Haversine formula, acc1 is the accuracy reported for the first location, acc2 is the accuracy reported for the second location, and adj is a predefined adjustment, which is determined based on the minimum accuracy level accepted by the server. When any accuracy is accepted adj is 1 when only accuracies of 100 or less are accepted adj is 3. en a non-intersecting location is reached the previous intersecting locations are merged to form a new location For example if there are 10 locations stored in the database A, B, C, D, E, F, G, H, I, J. If an intersection is detected between A&B, B&C, C&D but not at D&E we will merge A, B, C & D into a new location K. There will be 6 accuracy adjusted coordinates. A<->B: divide line in ratio of AccuracyA:AccuracyB . . . gives new co-ordinate AB. A<->C: divide line in ratio of AccuracyA:AccuracyC . . . gives new co-ordinate AC. A<->D: divide line in ratio of AccuracyA:AccuracyD . . . gives new co-ordinate AD. B<->C: divide line in ratio of AccuracyB:AccuracyC . . . gives new co-ordinate BC. B<->D: divide line in ratio of AccuracyB:AccuracyD . . . gives new co-ordinate BD. C<->D: divide line in ratio of AccuracyC:AccuracyD . . . gives new co-ordinate CD. Then these coordinates are averaged to get the new merged latitude and longitude values. For example, Weight (w)=6, Latnew=(LatAB+ LatAC+LatAD+LatBC+LatBD+LatCD)/w; Longnew= (LngAB+LngAC+LngAD+LngBC+LngBD+LngCD)/w; Accuracydisplay=(AccuracyA+AccuracyB+AccuracyC+ AccuracyD)/4; and Accuracynew=MAX (AccuracyA+AccuracyB+AccuracyC+AccuracyD), where Start time=TimeA and End time for the measurements=TimeD. The process continues to the end of the list detecting intersections. We then remove A, B, C and D from the list and replace them with the newly calculated location. The algorithm is repeated until no new intersections are found.

For the new location the max accuracy in detecting intersections is used, i.e. for the new location above the accuracy used for calculations on this location will be the max of AccuracyA, AccuracyB, AccuracyC and AccuracyD. When there are no more intersections the list is traversed again and any location that is preceded and followed by a merged location, is discarded as an outlier. The algorithm is repeated until no intersections are found, then merge locations again after outliers have been removed.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method executed at least in part within a processor coupled to a memory device, wherein a storage device is coupled the memory device and to a measuring device for determining a position, the storage device configured to store a plurality of position measurements, the method comprising:
   a. obtaining a plurality of position measurements by the measuring device, the measurements comprising a position value, a time of measurement value, and an accuracy value;
   b. organizing the plurality of position measurements into an ordered list comprising sorting the plurality of position measurements using a sorting key comprising at least one of the position values, the time of measurement values, and the accuracy values;
   c. obtaining a first position measurement from the ordered list;
   d. obtaining successive position measurement from the ordered list wherein said successive position measurement corresponds to a lower ranking in the ordered list than the first position measurement;
   e. determining whether a successive position measurement in the ordered list should be merged in a merge operation with said first position measurement, the determination made by concluding that a distance between the position value of the respective first and second position measurements is less than a predetermined accuracy threshold, wherein:
      should the determination indicate that the first position measurement and the successive position measurement be merged, performing a merge operation comprising creating a merged position measurement using a merge algorithm with the first position measurement and the successive position measurement as inputs, and replacing the first position measurement and the successive position measurement in the ordered list with a single merged position measurement, assigning the merged position measurement to be the first position measurement and iterating to step d. until no more successive position measurements remain in the ordered list whereupon processing continues with step f; and
      should the determination indicate that the first position measurement and the successive position measurement not be merged, assigning the successive position measurement as the first position measurement, and iterating to step d. until no more successive position measurements remain in the ordered list whereupon processing continues with step f.; and
   f. for each non-merged position measurement remaining in the ordered list, identify whether said remaining position measurement corresponds to an outlier measurement by: determining whether said each position measurement was immediately preceded by a merged position measurement in the ordered list or immediately followed by a merged position measurement in the ordered list, and should such determination be made, removing said outlier value from the ordered list.

2. The method as defined in claim 1, further comprising:
   g. if the ordered list was modified as a result of completion of steps e. and f., and if at least two position values remain in the ordered list:
      assigning a first value in the ordered list as the first position measurement; and
      continuing processing with step d.
      if the ordered list was modified as a result of completion of steps e. and f.

3. The method as defined in claim 1, wherein the position value comprises a latitude value and longitude value.

4. The method as defined in claim 3, wherein the position value further comprises an altitude value.

5. The method as defined in claim 1, wherein determining whether a successive position measurement in the ordered list should be merged in a merge operation with said first position measurement further comprises:
   e1. determining a distance between the position value of the first position measurement and the position value of the successive position measurement; and
   e2. if the determined distance is less than an accuracy threshold, indicating that the first position measurement and the second position measurement be merged.

6. The method as defined in claim 5, wherein determining a distance between the position value of the first position measurement and the position value of the successive position measurement further comprises using the Haversine formula to calculate the distance between points indicated by the position value of the first position measurement and the position value of the successive position value.

7. The method as defined in claim 5, wherein the accuracy threshold is determined by the sum of:
the accuracy value of the first position measurement multiplied by an accuracy adjustment constant; and
the accuracy value of the successive position measurement multiplied by the accuracy adjustment constant.

8. The method as defined in claim 7, wherein the accuracy adjustment constant is computed by a predetermined constant divided by a minimum accepted accuracy value.

9. The method as defined in claim 8, wherein the predetermined constant is 250.

10. The method as defined in claim 1, wherein the single merged position measurement is derived by:
determining the formula for a theoretical line that contains the position value for the first position measurement and the position value for the successive position measurement;
calculating a position of a merge point that lies on the line by dividing the line with a ratio of the accuracy value of the first position measurement and the accuracy value of the successive position measurement; and
assigning the position of the merge point to the position value of the merged position measurement.

11. The method as defined in claim 10, wherein the single merged position measurement is further derived by:
assigning an average of the accuracy values of the first position measurement and the successive position measurement to the accuracy value of the merged position measurement; and
assigning an average of the time of measurement values of the first position measurement and successive position measurement to the time of measurement value of the merged position measurement.

12. The method as defined in claim 1, wherein the position value comprises Cartesian coordinates representing a location on a map.

13. The method as defined in claim 1, wherein the position value comprises Cartesian coordinates representing a location on Earth.

14. The method as defined in claim 1, wherein the position value comprises Cartesian coordinates representing a location in space.

15. The method as defined in claim 1, wherein the position value comprises universal transverse mercator (UTM) coordinates.

16. The method as defined in claim 1, wherein obtaining a plurality of position measurements further comprises determining a predetermined number of position measurements based on a perceived accuracy of a measuring device, and specifying that the predetermined number of position measurements be obtained prior to proceeding with step b.

17. The method as defined in claim 1, further comprising determining that a measurement device is not in motion by determining that a subset of the plurality of position measurements were merged in the ordered list.

18. The method as defined in claim 1, further comprising determining that a measurement device is in motion by determining that after completion of steps a. through f., more than one of the position measurements remain unmerged in the ordered list.

19. A system comprising:
a measuring device for determining a position,
a storage device coupled to the measuring device, the storage device configured to store a plurality of position measurements;
a processor, coupled to the storage device;
a memory, coupled to the storage device, that contains instructions configuring the system to execute steps comprising:
a. obtaining, by the measuring device, a plurality of position measurements, the measurements comprising a position value, a time of measurement value, and an accuracy value; and
storing the plurality of the position measurements in the storage device;
b. organizing the plurality of position measurements into an ordered list comprising sorting the plurality of position measurements using a sorting key comprising at least one of the position values, the time of measurement values, and the accuracy values;
c. obtaining a first position measurement from the ordered list;
d. obtaining successive position measurement from the ordered list wherein said successive position measurement corresponds to a lower ranking in the ordered list than the first position measurement;
e. determining whether a successive position measurement in the ordered list should be merged in a merge operation with said first position measurement, the determination made by concluding that a distance between the position value of the respective first and second position measurements is less than a predetermined accuracy threshold, wherein:
should the determination indicate that the first position measurement and the successive position measurement be merged, performing a merge operation comprising creating a merged position measurement using a merge algorithm with the first position measurement and the successive position measurement as inputs, and replacing the first position measurement and the successive position measurement in the ordered list with a single merged position measurement, assigning the merged position measurement to be the first position measurement and iterating to step d. until no more successive position measurements remain in the ordered list whereupon processing continues with step f; and
should the determination indicate that the first position measurement and the successive position measurement not be merged, assigning the successive position measurement as the first position measurement, and iterating to step d. until no more successive position measurements remain in the ordered list whereupon processing continues with step f.; and
f. for each non-merged position measurement remaining in the ordered list, identify whether said remaining position measurement corresponds to an outlier measurement by: determining whether said each position measurement was immediately preceded by a merged position measurement in the ordered list or immediately followed by a merged position measurement in the ordered list, and should such determination be made, removing said outlier value from the ordered list.

20. The system as defined in claim 19, further comprising:
g. if the ordered list was modified as a result of completion of steps e. and f., and if at least two position values remain in the ordered list:
assigning a first value in the ordered list as the first position measurement; and
continuing processing with step d.

21. The system as defined in claim 19, wherein the position value comprises a latitude value and longitude value.

22. The system as defined in claim 21, wherein the position value further comprises an altitude value.

23. The system as defined in claim 19, wherein determining whether a successive position measurement in the ordered list should be merged in a merge operation with said first position measurement further comprises:
e1. determining a distance between the position value of the first position measurement and the position value of the successive position measurement; and
e2. if the determined distance is less than an accuracy threshold, indicating that the first position measurement and the second position measurement be merged.

24. The system as defined in claim 23, wherein determining a distance between the position value of the first position measurement and the position value of the successive position measurement further comprises using the Haversine formula to calculate the distance between points indicated by the position value of the first position measurement and the position value of the successive position value.

25. The system as defined in claim 23, wherein the accuracy threshold is determined by the sum of:
the accuracy value of the first position measurement multiplied by an accuracy adjustment constant; and
the accuracy value of the successive position measurement multiplied by the accuracy adjustment constant.

26. The system as defined in claim 25, wherein the accuracy adjustment constant is computed by a predetermined constant divided by a minimum accepted accuracy value.

27. The system as defined in claim 26, wherein the predetermined constant is 250.

28. The system as defined in claim 19, wherein the single merged position measurement is derived by:
determining the formula for a theoretical line that contains the position value for the first position measurement and the position value for the successive position measurement;
calculating a position of a merge point that lies on the line by dividing the line with a ratio of the accuracy value of the first position measurement and the accuracy value of the successive position measurement; and
assigning the position of the merge point to the position value of the merged position measurement.

29. The system as defined in claim 28, wherein the single merged position measurement is further derived by:
assigning an average of the accuracy values of the first position measurement and the successive position measurement to the accuracy value of the merged position measurement; and
assigning an average of the time of measurement values of the first position measurement and successive position measurement to the time of measurement value of the merged position measurement.

30. The system as defined in claim 19, wherein the position value comprises Cartesian coordinates representing a location on a map.

31. The system as defined in claim 19, wherein the position value comprises Cartesian coordinates representing a location on Earth.

32. The system as defined in claim 19, wherein the position value comprises Cartesian coordinates representing a location in space.

33. The system as defined in claim 19, wherein the position value comprises universal transverse mercator (UTM) coordinates.

34. The system as defined in claim 19, wherein the measuring device comprises a position measurement component within one of a mobile telephone, a smartphone, a computing tablet, a mapping device, a survey instrument, a GPS navigation device, a traffic navigation device, an airspace navigation device, a water navigation device, a seismograph, a laser measurement device, and combinations of thereof.

35. The system as defined in claim 19, wherein obtaining a plurality of position measurements further comprises determining a predetermined number of position measurements based on a perceived accuracy of a measuring device, and specifying that the predetermined number of position measurements be obtained prior to proceeding with step b.

36. The system as defined in claim 19, further comprising determining that a measurement device is not in motion by determining that a subset of the plurality of position measurements were merged in the ordered list.

37. The system as defined in claim 19, further comprising determining that a measurement device is in motion by determining that after completion of steps a. through f., more than one of the position measurements remain unmerged in the ordered list.

38. The system as defined in claim 19, further comprising:
a network coupling the measuring device to the storage device; and
wherein the storage device comprises at least one of: a memory in the measuring device and a database coupled to the measuring device through the network.

* * * * *